UNITED STATES PATENT OFFICE.

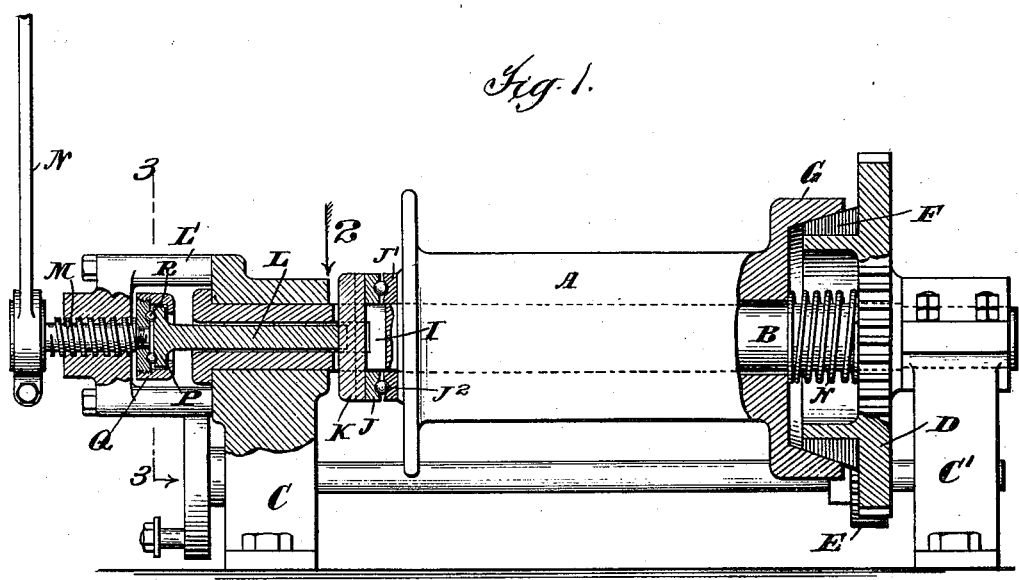
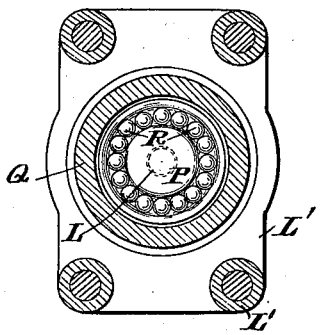
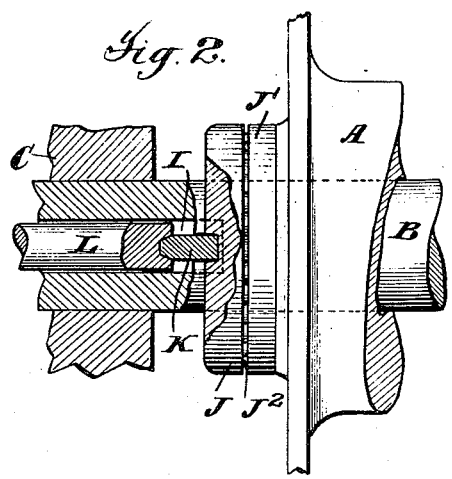

JOSEPH S. MUNDY, OF NEWARK, NEW JERSEY.

FRICTION-DRUM.

SPECIFICATION forming part of Letters Patent No. 616,198, dated December 20, 1898.

Application filed April 28, 1898. Serial No. 679,058. (No model.)

*To all whom it may concern:*

Be it known that I, JOSEPH S. MUNDY, a citizen of the United States, and a resident of Newark, in the county of Essex and State of New Jersey, have invented certain new and useful Improvements in Friction-Drums, of which the following is a specification.

This invention relates to improvements in hoisting-drums, the object being to produce such a device in which the friction between the drum and the mechanism for engaging it with the friction device will be reduced to a minimum. In the drums now in use it frequently occurs that at this point the parts become highly heated, and it has been found in practice that oil or lubricants will not effectually prevent this heating. By my invention I seek to overcome this defect; and to this end my invention consists of the certain combination and arrangement of parts, hereinafter more fully pointed out, and described in the claims.

Referring to the drawings, Figure 1 is a side view, partly in section. Fig. 2 is a section of Fig. 1, looking in the direction of the arrow 2; and Fig. 3 is an end view, partly in section, taken on the line 3 3 of Fig. 1.

In the drawings, A is the drum, loosely mounted on the constantly-driven shaft B, which rotates in the journals C C'. The gear D is fixed on the shaft B and is rotated to rotate said shaft by the pinion E. To the gear D is attached the friction-cone F, which engages the cone G of the drum when the latter is thrown to the right by the operating means to be described. A spring H, surrounding the shaft B, forces the drum out of engagement with the friction-cone F when it is desired to release the drum. The shaft B is hollow at one end and is provided with a slot I. A collar J is located on the shaft B, and through this collar J is passed a gib or key K, which is secured to the collar J, but which is adapted to move horizontally in the slot I to a limited extent, carrying with it the collar J. A collar J' is secured to the end of the drum, as shown, and between the collars J and J' are located a series of hardened-steel balls J² for a purpose hereinafter described. The thrust-pin L extends for a portion of its length into the hollow of the shaft B and is slotted at its inner end to engage the gib or key K. A claw or bracket L' is bolted on the journal C, and through this bracket passes the screw M, to which is attached the operating-lever N, by means of which it is rotated to thrust the pin L, and with it the drum A, forwardly to engage the drum with the friction device. This pin L is constantly rotating with the shaft B, and when the drum is thrown into engagement with the friction device the pressure between the end of the screw M and the pin L is materially increased. At this point the friction is so great that the parts frequently become highly heated and occasionally partially weld or stick together, thus making the machine inoperative. Efforts have been made to prevent this by inclosing the bracket L' and filling the chamber thus formed with oil. This has not been found to be effective for the reason that the rapidly-rotating thrust-pin forces the oil out from between its end and the end of the operating-screw, against which it bears. By my invention I obviate this difficulty in the following manner: The end of the thrust-pin L is provided with a circular disk P, preferably integral therewith, which is inclosed in a circular box Q, attached to the inner end of the operating-screw M. Between these two surfaces are located a series of hardened-steel balls R, confined in suitable runways. After the load has been hoisted and it is desired to lower it again the shaft B is rotated rapidly in one direction and the drum A in the opposite direction by the unwinding of the cable. When this occurs, the collars J and J' rotate in opposite directions, and the balls J² prevent any undue heating at this point. By these means I have found in practice that the heating of the parts is done away with under all circumstances, and the consequent partial welding is avoided. By my invention the action of the drum is also more easily and positively controlled by the lever N.

What I claim as new, and desire to secure by Letters Patent, is—

1. A hoisting-machine comprising a rotating shaft, a drum loosely mounted thereon, a friction device for engaging the drum, a pin rotating with said shaft, means for moving said pin to throw the drum into engagement with the friction device, and a series of steel balls located between said pin and the means for operating said pin substantially as described.

2. A hoisting-machine comprising a rotating shaft, a drum loosely mounted thereon, a friction device for engaging the drum, a pin rotating with said shaft, means for moving said pin to throw the drum into engagement with the friction device, a series of balls located between the pin and the means for operating said pin, a collar mounted on the said shaft adapted to be moved by the pin, a second collar adapted to rotate with the drum, and a series of balls located between the two collars, substantially as described.

3. In a hoisting-machine, a shaft, a drum mounted thereon, a friction device adapted to engage the drum, a thrust-pin having a circular disk, operating mechanism having a similar disk, and a series of balls located between the two disks, substantially as described.

4. In a hoisting-machine, a constantly-rotating shaft, a drum mounted thereon, a friction device adapted to engage the drum, a collar rotating with the shaft, a collar rotating with the drum, and a series of balls located between the two collars, whereby when the two collars are rotating in opposite directions, the excessive friction is destroyed, substantially as described.

5. In a hoisting-machine the combination with the shaft, the drum mounted thereon, and the friction device adapted to engage the drum, of the thrust-pin L, adapted to operate said friction device; said pin having the disk P, the screw M, adapted to operate the pin, and having the box Q, and a series of balls R between the screw and the pin, arranged and adapted to operate in the manner set forth.

6. In a hoisting-machine, the combination with the shaft, the drum mounted thereon, and the friction device adapted to engage the drum, of the thrust-pin L, adapted to operate said friction device, and said pin having the disk P; the screw M, adapted to operate the pin and having the box Q; a series of balls R, located between the said disk and box; the collars J and J', and the balls J², located between said collars, all arranged and adapted to operate in the manner set forth.

Signed by me, at Newark, in the county of Essex and State of New Jersey, this 8th day of February, 1898.

JOSEPH S. MUNDY.

Witnesses:
FREDERICK R. LEHLBACH,
CECIL H. MACMAHON.